United States Patent [19]
Eyman et al.

[11] 3,804,657
[45] Apr. 16, 1974

[54] PROCESS FOR PRODUCING DECORATIVE SURFACE COVERING

[75] Inventors: Douglas R. Eyman; Walter J. Lewicki, Jr., both of Lancaster, Pa.

[73] Assignee: Armstrong Cork Company, Lancaster, Pa.

[22] Filed: June 7, 1971

[21] Appl. No.: 150,391

[52] U.S. Cl............ 117/11, 117/15, 117/21, 117/45, 264/45, 264/47, 264/52, 264/126
[51] Int. Cl............................................ D21h 1/10
[58] Field of Search............ 117/8, 8.5, 11, 15, 38, 117/45, 21; 264/45, 47, 52, 122, 126

[56] References Cited
UNITED STATES PATENTS

| | | | |
|---|---|---|---|
| 3,068,118 | 12/1962 | Biskup et al. | 117/76 |
| 3,144,355 | 8/1964 | Raskin | 117/8 X |
| 3,224,894 | 12/1965 | Palmer | 117/11 |
| 3,239,365 | 3/1966 | Petry | 117/11 |
| 3,278,322 | 10/1966 | Harkins et al. | 117/15 X |
| 3,359,352 | 12/1967 | Powell | 264/54 X |
| 3,365,353 | 1/1968 | Witman | 264/52 |
| 3,373,072 | 12/1968 | Jones | 217/11 X |
| 3,519,527 | 7/1970 | Crowley | 264/54 X |
| 3,542,577 | 11/1970 | Al | 117/8.5 X |
| 3,591,401 | 7/1971 | Snyder et al. | 117/11 X |
| 2,371,868 | 3/1945 | Berg et al. | 264/54 X |
| 3,192,294 | 6/1965 | Streed et al. | 264/126 X |
| 3,359,352 | 12/1967 | Powell et al. | 264/54 X |

*Primary Examiner*—William D. Martin
*Assistant Examiner*—M. R. Lusignan

[57] ABSTRACT

A process for producing a resinous composition surface covering having a multi-level decorative surface by depositing a layer of granular resinous dryblend on a backing sheet, heating the granules to form a porous cohesive layer therefrom, cooling the layer and applying settable resinous inks thereto to form a design thereon, gelling the ink, removing non-design carrying portions of the porous layer, and heating to fuse all of the remaining resinous material. Additional surface alterations of the multi-level surface, such as texturing, may be accomplished by chemical or mechanical means. After-finish coatings may be applied to enhance the appearance and utility of the surface covering.

16 Claims, 2 Drawing Figures

INVENTOR
DOUGLAS R. EYMAN
WALTER J. LEWICKI, JR.

PROCESS FOR PRODUCING DECORATIVE SURFACE COVERING

BACKGROUND OF THE INVENTION

1. Field of the Invention

This invention relates to a process for forming a multi-level decorative resinous surface covering wherein a settable ink design is applied to and gelled within a porous dryblend layer on a backing prior to subsequent removal of the non-design carrying portions of the porous layer and fusion of the remaining resinous material.

2. Description of the Prior Art

It is commonly known to produce plastic sheets for floor and wall coverings, and the like, wherein the fused layer contains a thermoplastic synthetic resinous binder, plasticizers and pigments. It is further known to enhance the appearance of such sheets by means of various decorative designs thereon which may extend partially or entirely through the sheet. Further enhancement of the appearance of such sheets has been accomplished by achieving a three-dimensional appearance thereon. Prior methods of doing this have included mechanical or chemical embossing techniques or inclusion with the granules of the sheet-forming composition of an ingredient which can be subsequently removed or altered to produce an embossed effect. These methods, however, do not produce the clean-cut sufficient depth of relief which is required in the embossed areas to achieve good three-dimensional effects when viewed from any angle.

U.S. Pat. No. 592,186 relates to a method for producing inlaid linoleum wherein granular linoleum-forming material is preconsolidated on a backing sheet at a slightly elevated temperature (sintering) to form a porous mass. The partially consolidated mass is then printed by means of the printing blocks or rollers so that the colored or inlaid effect penetrates to a greater or less extent the substance of the linoleum. The sheet is then fully consolidated by heat and pressure.

U.S. Pat. No. 3,359,352 relates to a method for forming a resinous composition surface covering having a geometric decoration. This is accomplished by depositing a layer of fine granules of resinous composition on the surface of the base, heating to sinter the granules and form a porous layer, printing a design on the sintered layer with a printing composition which will penetrate into the porous composition and then, by heat with or without pressure, forming the printed porous layer into a non-porous layer containing an inlaid design. It is further disclosed by this patent that a textured or embossed product can be obtained by including with the granules a substance which on further treatment will create voids in the granular layer. Controlling the amount of printing composition to fill such voids controls the location and depth of the embossing.

U.S. Pat. No. 2,371,868 relates to the production of porous poly(vinyl chloride) compositions containing plasticizers. In practicing the invention of this patent, the powdered or granular poly(vinyl chloride) is mixed with the plasticizers or a mixture of plasticizers and volatile solvents. The mixture is deposited on a base and sintered to form a porous mass. If only a small degree of porosity is desired, the composition may be pressed when heating. The porous mass may be colored with a composition which penetrates thereinto. If desired, the colored porous mass may be subjected to heat (and pressure if desired) to eliminate the pores in part or in whole to form items such as floor mats, upholstery, etc.

U.S. Pat. No. 3,192,294 relates to a method of molding vinyl resin sheet material having an embossed surface. This process involves the forming and depositing of a poly(vinyl chloride) dryblend on a release carrier (or a base vinyl sheet) and heating the layer to sinter the particles thereby forming a porous, grainy, coherent sheet. The sheet may then be embossed by a hot roll which closes all pores in the sheet. Decorative effects may be achieved by sprinkling colored powders in a suitable design on the dryblend layer *before* the heat sintering step.

The foregoing processes, however, do not provide a product having the highly desirable, sharp, clearly defined depth of relief in the embossed pattern necessary to create the improved three-dimensional appearance required for enthusiastic public acceptance.

SUMMARY OF THE INVENTION

This invention relates to a process for producing a surface covering having a multi-level decorative wear surface wherein a layer of resinous dryblend is deposited on the surface of a backing sheet and heated to form a porous coherent layer. Prior to deposition of the dryblend on the backing, the backing may be provided with a barrier coating which may be decorated. The backing may further be coated with a plastisol which may be gelled and decorated. Alternately, a hard sintered dryblend base may be applied to the backing, or the dryblend may be deposited onto a backing sheet coated with a filled plastisol which is not gelled. After forming, the porous layer is then cooled and a design is produced thereon by applying a settable resinous ink in sufficient amounts to permit penetration thereof through the thickness of the porous layer to the backing at the points of application. The ink is then gelled and the non-design carrying portions of the porous layer are removed, leaving the design carrying portions which are protected by the gelled ink substantially unaffected. The surface covering is then heated to fuse all of the remaining resinous material. The surface of the resulting sheet may be textured by chemical or mechanical means and, if desired, a clear resinous coating may be applied thereover.

The foregoing process eliminates the deficiencies existing in the prior art methods of making a surface covering having decorative wear surfaces in general and multi-level wear surfaces in particular. This is accomplished in a simple, inexpensive and straightforward manner which results in a greater depth of relief in the embossed areas, a sharper and a more clearly defined three-dimensional appearance when viewed from any angle, all of which is accomplished with a minimum of expense and equipment. Further, by this method it is possible to provide a resinous sheet of extended width with an in-register multi-level decorative surface without the need for the use of embossing equipment as such.

DESCRIPTION OF THE PREFERRED EMBODIMENT

This invention is applicable to all resinous materials, such as vinyls, etc., which, in granular form, may be formed into a cohesive porous layer on a carrier.

Figure 1:
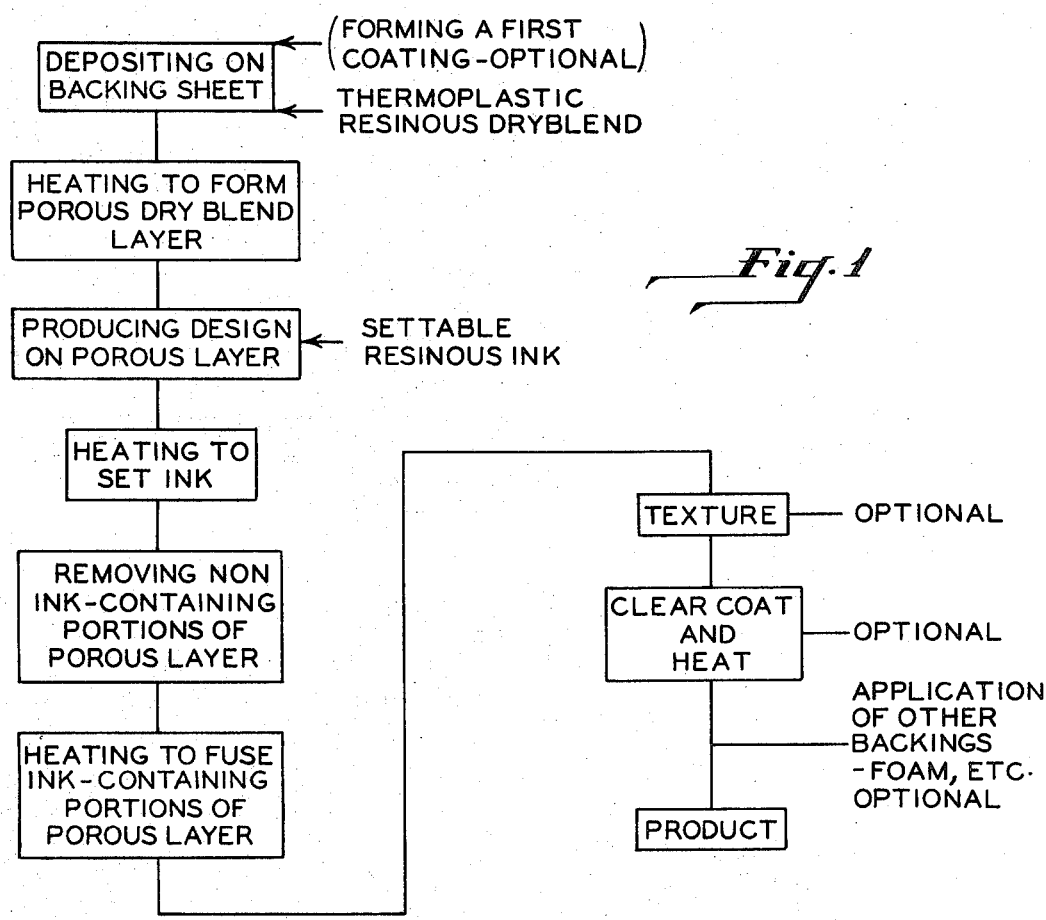
FIG. 1 is a flow diagram depicting the steps followed in carrying out the method of this invention.

As shown by the flow diagram in FIG. 1 of the drawings, the manufacturing process begins with the deposition of a thermoplastic resinous dryblend such as plasticized poly(vinyl chloride) on a backing such as a beater saturated rubber-asbestos sheet, for example. Other fibrous carriers may include resin-bonded glass webs, bonded synthetic webs, etc. These carriers may become the final backing or may be supplemented with other cushioning materials, such as foams, non-woven material, etc. Optionally, the carrier may be coated with a plastisol base coat which may be pigmented and/or incorporate fillers such as coarse limestone, silica, metallic particles, etc., to produce desirable visual or physical characteristics in the final product. Alternately, the carrier may be predecorated in the same fashion. The dryblend lay-up may consist of one or more layers of granular resinous material which may differ in formulation and sintering temperatures.

The resinous mix commonly referred to as a vinyl dryblend is in the form of a free-flowing homogeneous mixture of unfused thermoplastic vinyl resin particles, liquid vinyl plasticizers, filler, pigment, and vinyl stabilizer.

The free-flowing mix of resin, plasticizer, stabilizer, pigment and filler may be readily formed by adding the resin, for example a homopolymer of vinyl chloride, in the form of discrete particles, along with the vinyl resin plasticizer such as di(2-ethyl hexyl) phthalate, butyl benzyl phthalate, epoxidized soybean oil, or tricresyl phosphate, filler, and pigment, and suitable vinyl resin stabilizers to a mixer or blender such as a Henschel blender where they are mixed under moderate heat, for instance at a temperature of about 200° F., for a period of time to ensure that the liquid plasticizer and stabilizer become absorbed and thus diffused throughout the resin particles and the remaining ingredients adsorbed thereon. Care is taken so that no fusion of the resin particles occurs during the mixing and the temperature must be kept below the point at which such fusion would occur.

Generally speaking, the addition of fillers and pigments to the mix may be made either initially, at the end of the mixing cycle when the resin particles remain relatively warm, or after the dry blended resin particles have been mixed and cooled. The color of the layers may be controlled over a wide range and substantially transparent or translucent layers may be achieved by omitting the filler and most or all of the pigment from the vinyl dryblend forming these layers. Based on 100 parts by weight of resin, 15 to 30 parts by weight plasticizer, 2 to 5 parts by weight stabilizer, 0 to 5 parts by weight pigment, and 0 to 25 parts by weight filler may be used in forming the free-flowing mixture.

A plastisol can be defined as a thermoplastic resin in the form of fine particles thoroughly and uniformly dispersed in plasticizer in the presence of small amounts of pigments, filler and stabilizers. A plastisol has appreciable fluidity at normal room temperatures but is converted by heat into a flexible, tough thermoplastic mass. This ultimate result is brought about by the process of fusion wherein the resin becomes plasticized and solvated by the plasticizer.

The next step in the process involves heating the dryblend to cause partial melting of the resin granules at their points of contact, thereby forming bonds which result in formation of a porous cohesive layer which is also bonded to the carrier. Bonding of the resinous granules at their points of contact may be effected either by sintering or, through activation of an external adhesive coating which may be applied in the final steps of granulation. Adhesives which may be applicable for bonding include hot melts, adhesives, and soluble (water, alcohols, ketones, etc.) resins.

The next step of the invention involves the production of a design on the porous layer by the application of settable resinous inks. The term "settable" as used herein with reference to the ink is meant to include thermoplastic and thermosetting inks which may be set or gelled by heat or chemical means. Therefore, after cooling, the porous layer may be printed with the ink in sufficient amounts to cause penetration thereof through the entire thickness of the layer to the backing. These inks may be foamable and non-foamable vinyl inks which are applied to specific areas of the porous layer. Printing may be done, for example, by a flat, or rotary screen printer. This ensures deeper penetration of the inks in comparison to the lesser penetration that would be obtained by rotogravure printing, for example. The inks may be colored as desired by means of dyes or pigments, or the inks may be colorless.

Sufficient heat is then applied to gel or set the inks which renders the printed areas inert during subsequent processing until final fusion. The gelling or setting of the ink is accomplished at a temperature below the fusion temperature of the granular thermoplastic resinous material. Alternately, the ink may be set chemically.

The next phase of the invention involves removal of a substantial portion or all of the non-design carrying portions of the porous layer in order to form depressed areas within the printed pattern. Removal of the granules may be accomplished by first physically or mechanically loosening the bonds therebetween. For example, the bonds between sintered PVC granules may be loosened by the application of a solvent, such as Xylene, by printing or coating methods. The bonds between adhesive-coated PVC granules may be loosened by the application of heat or a suitable solvent for the coating. In the cases involving solvent application, the solvent can be suitably thickened and applied to the sheet in an overall manner by any conventional coating method, since the gelled printed portions of the porous layer are substantially unaffected by the action of the solvent. Mechanical brushing, air-blast, sand-blasting with appropriate particles followed by vacuuming or sweeping may be used to remove lightly bonded PVC granules or loosened dryblend material from the unprinted areas. It is important to note that the relatively inert printed and gelled ink areas of the pattern are substantially unaffected by these granule removal processes.

Since the sintered dryblend in the unprinted areas can be removed down to the backing, considerable depths of relief can be accomplished. As much as 35 mils of depth have been achieved from the top of the walking surface of a flooring material to the top of the coated backing after fusion.

The next step in the manufacture of the multi-level surface covering of this invention is fusion of all the remaining resinous material, plus formation of a foam in any portions having a blowing agent incorporated therein.

The visual and physical characteristics of the embossed surface covering may be further altered by chemical means, mechanical means, or by after-finish coating to enhance appearance and utility. For example, texturing of the walking surface may be coordinated in detail with any textured effect produced in a coated backing to which the dryblend has been applied. As previously stated, texturing may be accomplished by the inclusion of various filler materials in a coating applied to the backing before lay-up of the dryblend. Cushioning layers, applied as cellular sheets or foamed latex, may be applied to the backing on the side which will be in contact with the floor.

Figure 2:
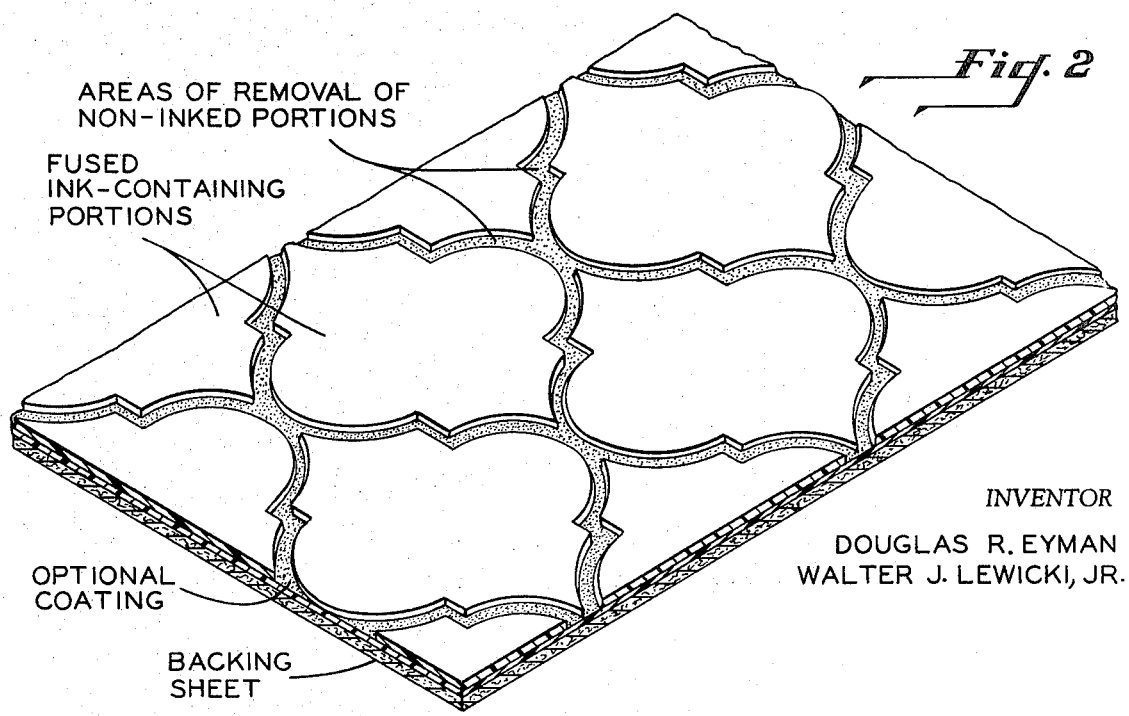
FIG. 2 is a perspective view of a multi-level decorative wear surface on a floor covering formed by the method of this invention.

As shown in FIG. 2 of the drawing, a product which may be produced through the use of the process disclosed by this invention is a multi-level vinyl resilient floor covering. Products which can be manufactured within the scope of this invention may include, but are not limited to, floor coverings, wall coverings, drapery and upholstery materials, furniture components, etc. Both flexible and rigid multi-level sheet products may be manufactured by the method of this invention without the use of chemical or mechanical embossing equipment and techniques and, the depressed areas thereon are in perfect registration with the printed pattern.

The following examples are given for purpose of illustration:

EXAMPLE I

A plastisol backcoating having the following composition was prepared:

|  | Parts |
| --- | --- |
| Poly(vinyl chloride) | 100 |
| Dioctyl phthalate | 32 |
| 2-2,4-trimethyl-1,3-pentanediol diisobutyrate | 48 |
| Modifed tin maleate (stabilizer) | 2 |
| Silicon dioxide filler | 8 |

A beater saturated sheet of rubber and asbestos of approximately 0.037 inch thickness was coated on one surface with a combination of acrylic lacquer and vinyl chloride vinyl acetate emulsion to seal the surface and provide adhesion of the vinyl resin to the asbestos sheet. The same sheet was coated on one surface with an 8 to 10 mil thickness of the above composition.

Dryblend granules were prepared by mixing the following components together in a conventional Henschel dryblending apparatus through a heat history from ambient conditions to 220° F. to ambient conditions.

|  | Parts |
| --- | --- |
| Poly(vinyl chloride) | 100 |
| Dioctyl phthalate | 35 |
| Modified tin maleate (stabilizer) | 2 |

The granules were deposited on the coated base sheet to form a uniform layer of 55 mils thickness. The sheet was then passed through a 30-foot long oven at a line speed of 15 feet to 20 feet per minute. The granules during this heating period reached a material temperature of about 270°–290° F. to gel the plastisol backcoating and sinter the dryblend. This resulted in two layers on the base sheet consisting of a 40 mil sintered top portion and a 15 mil portion consisting of the gelled plastisol with sintered dryblend embedded therein.

The sintered mass was then cooled and a design was printed on its surface. The printing inks had the following composition:

|  | Parts |
| --- | --- |
| Poly(vinyl chloride) | 100 |
| Dioctyl phthalate | 32 |
| 2-2,4-trimethyl-1,3-pentanediol diisobutyrate | 17 |
| Modified tin maleate (stabilizer) | 2 |

The coated sheet carrying the printed sintered composition was then heated in an oven for one to two minutes to a surface temperature of 216° F. to gel the printing composition. The product was then cooled to a temperature between 50°–110° F. and the nonprinted portions of the porous layer were removed by brushing. The product was then heated in an oven for 2 to 3 minutes to a temperature of 420°–440° F. to fuse all remaining resinous material. The raised portions of the fused and decorated areas of the pattern were textured with an embossing roll.

The final product is a textured floor covering consisting of a total fused PVC thickness layer of 0.042 inch of which the recessed areas were 0.015 inch thick. The actual amount of "embossing" depth achieved was 0.027 inch. Gloss and texture of both walking surfaces and recessed areas are of medium level and are similar in appearance.

EXAMPLE II

A beater saturated sheet of rubber and asbestos of approximately 0.037 inch thickness was coated on one surface with a layer of 30 mils thickness of a dryblend having the following composition:

|  | Parts |
| --- | --- |
| Poly(vinyl chloride) | 100 |
| Dioctyl phthalate | 35 |
| Modified tin maleate (stabilizer) | 2 |

The dryblend on the carrier was then heated to a surface temperature of 380° F. for one minute to sinter the composition hard. This resulted in a 15 mil thick porous layer on the base sheet. The product was then cooled and a 45–50 mil thick layer of dryblend having the following composition was applied over the previously sintered layer:

|  | Parts |
| --- | --- |
| Poly(vinyl chloride) | 100 |
| Dioctyl phthalate | 35 |
| Modified tin maleate (stabilizer) | 2 |

This layer of dryblend was then heated for 1.5 to 2 minutes to a material temperature of 270°–290° F. to sinter it. This resulted in a thickness of the combined sintered layers of 55 mils. The product was then printed, the inks gelled, and the substrate cooled as in Example I. The product was then brushed at 25 to 50 feet per minute to remove the portions of the porous material devoid of printing, and vacuumed to remove any loose dryblend on the pattern. The product was then heated to fuse the remaining material.

The final product is a floor covering consisting of a total fused PVC thickness layer of 0.042 inch of which the depressed areas were 0.015 inch thick.

The actual amount of "embossing" depth obtained was 0.027 inch. The depressed areas were visually textured and of low gloss (matte-finish) unlike the untextured appearance of the walking surfaces.

EXAMPLE III

A beater saturated sheet of rubber and asbestos of approximately 0.037 inch thickness was coated on one side with methylcellulose (10 lb/100 yd$^2$) and acrylic lacquer (3 lb./100 yd$^2$) to provide a sealed carrier having release characteristics. The same side of the sheet was coated with a 10-13 mil layer of plastisol having the following composition:

|  | Parts |
| --- | --- |
| Poly(vinyl chloride) | 100 |
| Dioctyl phthalate | 32 |
| 2-2,4-trimethyl-1,3-pentanediol diisobutyrate | 17 |
| Modified tin maleate (stabilizer) | 2 |

The coating was gelled by heating for one-sixteenth minute to a surface temperature of 140° F. A 55 mil thick layer of dryblend having the following composition was then applied to the gelled coating:

|  | Parts |
| --- | --- |
| Poly(vinyl chloride) | 100 |
| Dioctyl phthalate | 27 |
| Epoxidized soybean oil | 5 |
| BaCd metal organic salt with phosphite and epoxy soya carriers | 5 |

The dryblend was then sintered hard by heating for 1.5 to 2 minutes to a surface temperature of 310°–320° F. The product was then printed and the printing gelled as in Example I. Xylene was doctored onto the sheet at a surface temperature of approximately 200° F. which weakened the particle to particle bonds in the unprinted regions of the sintered layer. The loosened dryblend was then removed from the unprinted areas using a compressed air hose, followed by vacuuming. The product was then fused as in Example I.

The final product consisted of a high gloss and smooth-surfaced floor covering consisting of a total fused PVC thickness layer of 0.045 inch of which the smooth depressed areas were 0.010 inch thick. The actual amount of "embossing" depth achieved was 0.035 inch.

EXAMPLE IV

A beater saturated sheet of rubber and asbestos of approximately 0.037 inch thickness was coated on one surface with a layer of 30 mils thickness of a dryblend having the following composition:

|  | Parts |
| --- | --- |
| Poly(vinyl chloride) | 100 |
| Dioctyl phthalate | 35 |
| Modified tin maleate (stabilizer) | 2 |

The dryblend on the carrier was then heated to a surface temperature of approximately 380° F. for 1 minute to sinter the composition hard. This resulted in a 20 mil thick porous layer on the base sheet. The product was then cooled and a 30 mil thick layer of dryblend C having the following composition was applied over the previously sintered layer:

| Part A | Parts |
| --- | --- |
| Poly(vinyl chloride) | 100 |
| Dioctyl phthalate | 35 |
| Modified tin maleate (stabilizer) | 2 |
| Part B |  |
| Alpha-methyl-styrene polymer (Melting point range = 190°–210° F.) | 10% by weight of Part A |
| Dryblend C = Part A plus Part B. |  |

Material B was ground to an extremely fine powder to serve as an adhesive and was incorporated into the Henschel dryblender at 10 percent by weight during the final cooling stages in the preparation of Part A. In this manner, the styrene powder adhered to the surfaces of the larger PVC dryblend particles of Part A to form dryblend C. This layer of styrene-coated dryblend was then heated for approximately one minute in a continuous oven to a material temperature of approximately 220° F. in order to melt the styrene-powder and adhere the PVC dryblend particles together to form a porous printing substrate. This temperature ordinarily would not adhere the particular PVC particles described by Part A together without the use of the styrene powder as an adhesive. The porous layer is further processed from the printing to fusing steps as it is described in Example I.

The final product is a floor covering consisting of a total fused PVC thickness of 0.040 inch of which the depressed areas were 0.015 inch thick. The actual amount of "embossing" depth obtained was 0.025 inch.

What is claimed is:

1. A process for producing a surface covering having a multi-level decorative wear surface comprising
   1. depositing at least one layer of unfused thermoplastic granules of resinous dryblend on a backing sheet;
   2. heating to form a cohesive porous layer from said dryblend by causing partial melting of at least the surface portions of the granules of the dryblend at their points of contact, thereby forming bonds which result in the formation of the cohesive porous layer;
   3. producing a design on said cohesive porous layer by applying a settable resinous ink in sufficient amounts to permit penetration thereof through substantially the entire thickness of the cohesive porous layer at the points of application;

4. heating to a temperature below the fusion temperature of the dryblend to set the ink;

5. loosening the bonds between the granules of the cohesive porous layer in the non-design carrying portions thereof to a depth substantially equal to the depth of penetration of said settable resinous ink;

6. removing the loosened granules from the cohesive porous layer while leaving the design carrying portions thereof substantially unaffected; and 7. heating to fuse the remaining resinous material.

2. The process according to claim 1, including the step of depositing a plastisol coating on the surface of the backing sheet prior to deposition of the resinous dryblend.

3. The process according to claim 2 wherein the plastisol coating is a filled plastisol.

4. The process according to claim 2, including the step of gelling the plastisol prior to deposition of the dryblend.

5. The process according to claim 2 wherein the plastisol coating is foamable.

6. The process according to claim 1, including the step of applying a clear coat subsequent to removing non-design carrying portions of the cohesive porous layer and prior to the final heating step.

7. The process according to claim 1 wherein the backing sheet is decorated by printing immediately prior to deposition of the resinous dryblend thereon.

8. The process according to claim 1 wherein the dryblend particles have an adhesive coating.

9. The process according to claim 1 wherein formation of the cohesive porous layer includes deposition of at least two layers of resinous dryblend on the backing sheet, each layer differing in formulation and degree of sintering.

10. The process according to claim 9, including heating the first dryblend layer to form a cohesive porous layer and decorating it prior to the deposition of the second dryblend layer thereon.

11. The process according to claim 1 wherein the removal of the porous material from the non-design carrying portions thereof includes the step of applying a solvent to soften the porous layer.

12. The process according to claim 11 wherein the solvent is applied only to the non-design carrying areas.

13. The process according to claim 11 wherein the solvent is applied as an overall coating to the design carrying surface of the sheet.

14. The process according to claim 1 wherein the removal of the non-design carrying portions of the porous structure is effected by brushing.

15. The process according to claim 1, including the step of forming a textured top surface on the fused design carrying portions of the surface covering.

16. The product produced by the process of claim 1.

* * * * *